United States Patent
Millican et al.

[11] Patent Number: 5,872,665
[45] Date of Patent: Feb. 16, 1999

[54] PROGRAMMABLE WRITE EQUALIZATION FOR MAGNETIC DATA RECORDING

[75] Inventors: Mark Millican, Boulder; Erik Habbinga, Longmont; Tod Earhart, Loveland, all of Colo.

[73] Assignee: Hewlett-Packard Company, Palo Alto, Calif.

[21] Appl. No.: 508,850

[22] Filed: Jul. 28, 1995

[51] Int. Cl.[6] .................................................. G11B 5/09
[52] U.S. Cl. ........................................................ 360/46
[58] Field of Search ................................ 360/40, 46, 48, 360/51, 65, 67, 68, 45

[56] References Cited

U.S. PATENT DOCUMENTS

| | | | |
|---|---|---|---|
| 3,855,616 | 12/1974 | Schneider | 360/40 |
| 5,060,089 | 10/1991 | Cleveland | 360/51 |
| 5,184,256 | 2/1993 | Chikusa | 360/65 |
| 5,187,614 | 2/1993 | Hashimoto et al. | 360/45 |
| 5,241,429 | 8/1993 | Holsinger | 360/46 |
| 5,255,130 | 10/1993 | Buchan et al. | 360/41 |

OTHER PUBLICATIONS

"Write equalization in high–linear–density magnetic recording", Richard C. Schneider; IBM J. Res. Develop, vol.29, No. 6, Nov. 1985, pp. 563–568.

*Primary Examiner*—Aristotelis M. Psitos
*Assistant Examiner*—Regina Y. Neal
*Attorney, Agent, or Firm*—Augustus W. Winfield

[57] ABSTRACT

A circuit and method for generating write compensated write data signals in magnetic data recording. The circuitry is programmable to enable generation of write compensation meeting a variety of write compensation specifications. In particular, the circuitry can be programmed to generate extra write pulses, to adjust the pulse width and to adjust the pulse spacing within data cells. In an example embodiment, an input waveform drives a reset input on a state machine. An output waveform shape is stored as a pattern of bits in a register. The state of the state machine determines which register bits are selected by a multiplexer for output as a new write compensated write data signal.

2 Claims, 3 Drawing Sheets

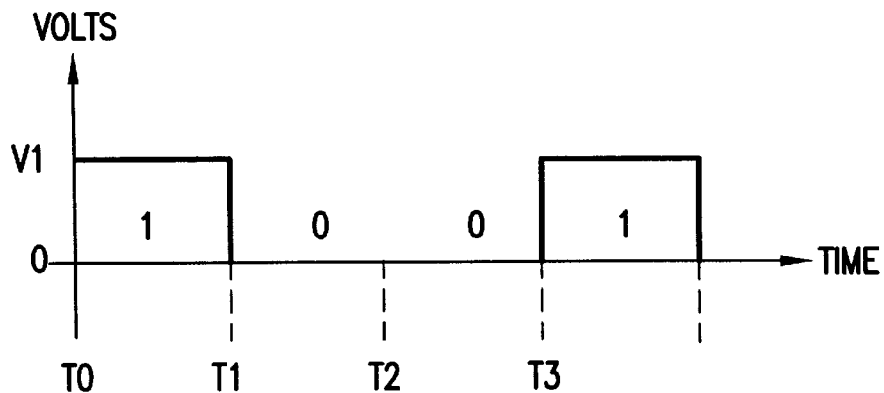
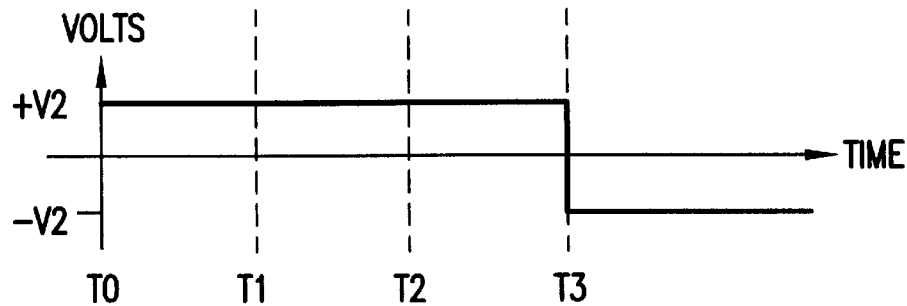
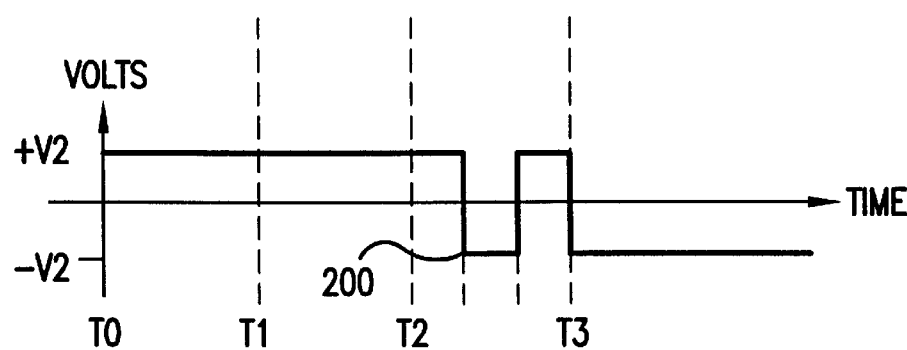
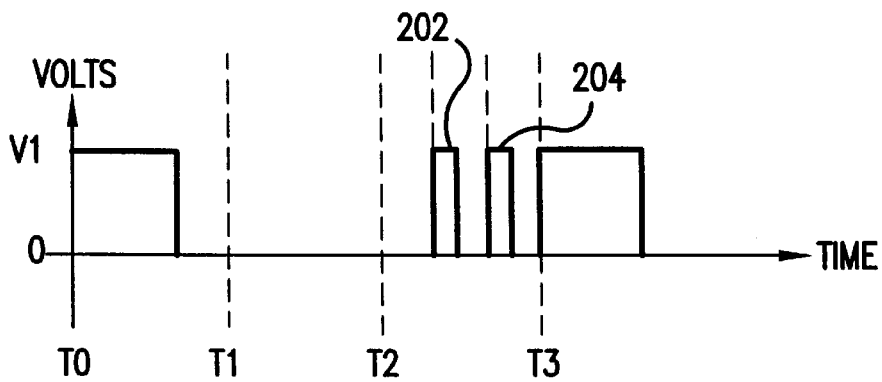

PROGRAMMABLE WRITE EQUALIZATION FOR MAGNETIC DATA RECORDING

FIELD OF INVENTION

This invention relates generally to magnetic data storage devices such as magnetic disk drives and tape drives and more specifically to programmable adjustment of equalization in a digital write signal.

BACKGROUND OF THE INVENTION

In general, in digital recording, information is encoded in the spacing of magnetic polarity reversals. During the reading process, the polarity reversals are converted into voltage pulses, so that the information in the read signal is encoded in the spacing of pulse peaks. Therefore, for data integrity, the accuracy of the timing of the peaks in the read signal is critical. There are, however, inherent distortions of the read signal that must be accommodated.

Binary information on magnetic disks and tapes is stored by magnetizing small areas of the magnetic surface with one of two polarities. For flexible disks and tapes, the small magnetized areas are typically recorded primarily longitudinally (in the plane of the surface). Although the magnetized areas are primarily longitudinal, they also have an unavoidable partial vertical component (perpendicular to the surface). During reading, a magnetic coil in a read head intersects magnetic fields from the small magnetized areas. As the head passes through the fields, a transition from one polarity to the opposite polarity results in a changing field that in turn induces a changing current in the coil of the read head. The changing current typically drives a resistive load to provide a voltage signal. Ideally, for purely longitudinal magnetization, an isolated transition from one polarity to the opposite polarity results in a perfectly symmetrical voltage pulse. Ideally, for purely vertical magnetization, an isolated transition from one polarity to the opposite polarity results in a perfectly symmetrical dipulse (a pulse of one polarity followed by a pulse of the opposite polarity). The combined longitudinal and vertical components result in an asymmetrical voltage pulse. The asymmetry is sometimes referred to as a peak shift. As bit densities increase, the transitions are no longer isolated. In particular, if two adjacent write transitions are very close together, the combined effects of peak shift and adjacent pulses make the time between read pulses on read-back longer than the time between the transitions during writing.

Given a particular digital pattern in the write waveform, it is possible to predict some of the resulting distortion in the read waveform. It is then possible to distort the writing signal (called precompensation or write equalization) to make the resulting read signal closer to ideal. For example, if two adjacent write transitions are very close together, then the first transition may be written late and the second transition written early. As a result, the time between transitions during writing is shorter than the ideal time and the time between pulses during read back is equal or closer to the ideal time. Alternatively, the shape of the analog read signal can be affected by inserting extra pulses in the write waveform. Typically, the frequency response of the magnetic head is such that these extra pulses do not result in complete polarity reversals in the surface of the data storage medium, but instead the fields on the magnetic medium are slightly modified (write equalized) to compensate for distortion and noise in the resulting read signals. For additional general background, see R. J. Schneider, "Write equalization in high-linear-density magnetic recording," *IBM J. Res. Develop.*, vol. 29, No. 6, 563–568 (November 1985).

Many removable-medium drives are adapted to accept a variety of magnetic media. Typically, different media types require different write equalization parameters. For example, flexible disk drives may accept flexible disks having two different recording densities. Likewise, tape drives may accept multiple types of tape. In some cases, after a particular drive has been shipped, a new magnetic medium may become commercially available having a new higher bit density or a different encoding pattern and therefore requiring different specifications for write compensation. In that case, it would be useful to be able to program the write equalization circuitry to accommodate the new media. There is an ongoing need for write equalization circuitry that can be programmed to accommodate a variety of equalization specifications.

SUMMARY OF THE INVENTION

The invention provides circuitry and a method for generating compensated write data signals. An example embodiment is provided that generates extra write pulses of the general type described by Schneider. The circuitry is programmable to enable generation of a variety of compensation specifications. In particular, the circuitry can be programmed to adjust the pulse width and the pulse spacing within data cells. In addition, the circuitry is simple, fast and glitch-free.

In the example embodiment, an input waveform drives a reset input on a state machine. An output waveform shape is stored as a pattern of bits in a register. The state of the state machine determines which register bits are selected by the multiplexer to generate a new binary output signal.

BRIEF DESCRIPTION OF THE DRAWINGS

FIG. 2A is an example timing diagram of an uncompensated and unencoded write data signal.

FIG. 2B is an example timing diagram of an encoded version of the waveform of FIG. 2A.

FIG. 2C is an example timing diagram of a compensated version of the waveform of FIG. 2B in accordance with the invention.

FIG. 2D is an example timing diagram of a compensated version of the waveform of FIG. 2A in accordance with the invention.

DETAILED DESCRIPTION OF THE PREFERRED EMBODIMENT OF THE INVENTION

Figure 1A:
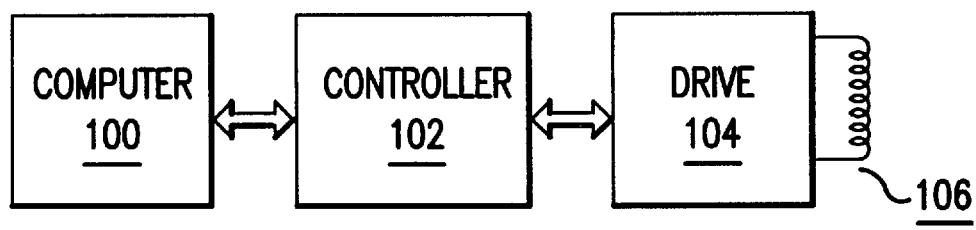
FIG. 1A is a block diagram of a computer system including a magnetic data storage device.

FIG. 1A illustrates an overview of a computer system. Computer 100 communicates with a peripheral controller 102. Controller 102 may be physically installed inside computer 100 or controller 102 may reside externally, for example, in a server connected to computer 100 via a network. Controller 102 communicates with a magnetic data storage drive 104. Drive 104 includes a magnetic head 106 for writing onto a magnetic medium.

Figure 1B:
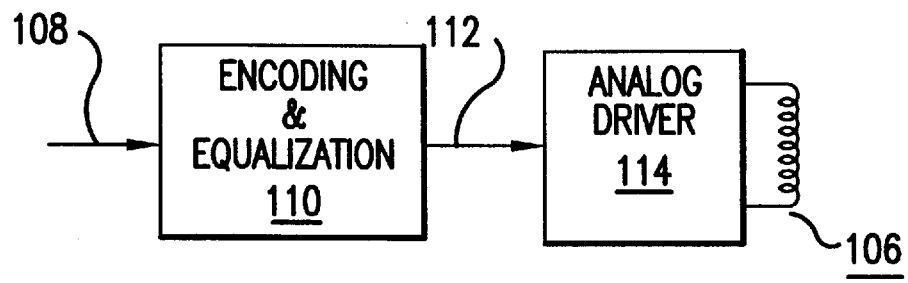
FIG. 1B is a block diagram of additional detail for the magnetic data storage portion of the system of FIG. 1A illustrating the location of the circuitry associated with the invention.

FIG. 1B illustrates further detail of part of the data storage system of FIG. 1A. An unencoded write data signal 108 provides serial binary data for recording. Typically, the data signal 108 is not in a form that can written directly to a magnetic data storage medium. The data signal 108 is typically encoded into a format that takes into account special requirements of magnetic recording. For example, self clocking read signals may be required, a limited number of sequential "ones" or "zeros" may be required, and as discussed above, write equalization may be required. Typical encoding includes MFM (Modified Frequency Modulation, or sometimes called Miller code) for flexible disk drives and RLL (Run Length Limiting) for hard disk drives. In addition, the encoded signal may be offset so that the signal is always at one of two complementary non-zero voltages, called NRZ (Non-Return to Zero). The unencoded write data signal 108 may be generated by the controller 102 or within a peripheral magnetic data storage drive 104. For example, the unencoded write data signal for flexible disk drives is typically generated by a flexible disk controller whereas the unencoded write data signal for hard disks is typically generated by electronics within the drive 104.

In general, write equalization and encoding are separate processes. Write equalization may be computed for either the unencoded signal or the encoded signal. Typically, for equalization of the type disclosed in Schneider, equalization pulses are computed separately and the encoded signal and the equalization signal are merged before being sent to analog magnetic head driver circuitry 114. In contrast, in a specific example embodiment discussed below, equalization pulses are merged into the unencoded signal and both signal and equalization pulses are then encoded.

FIGS. 2A–2D provide some example waveforms. The waveform in FIG. 2A illustrates an unencoded write data signal. The time interval from time T1 to time T2 (and T2 to T3, etc.) is a bit cell. If the waveform in FIG. 2A is high at the beginning of a bit cell a binary "one" is designated and if the waveform in FIG. 2A is low at the beginning of a bit cell a binary "zero" is designated. The first four bitcells for the waveform in FIG. 2A designate the binary number 1001. The waveform in FIG. 2B represents an encoded version of the waveform in FIG. 2A where every binary "one" in the waveform in FIG. 2A results in a single transition of the waveform in FIG. 2B. Note that the waveform in FIG. 2B is also NRZ. The waveform in FIG. 2B is in the proper form for driving a magnetic head.

One goal of the invention is to implement a rule or algorithm for generating compensation pulses. An example rule for generating a compensation pulse (of the general type of compensation disclosed in Schneider) is as follows: if there are two or more successive "zeros" in the serial data, for every "zero" after the first, write a pulse having a pulse width of one-third of a bit cell width displaced within the bit cell by one-third of a bit cell width. The waveform in FIG. 2C represents the waveform in FIG. 2B with the addition of a compensation pulse 200 following the rule just described. Presumably, the frequency response of the head (FIG. 1A, 106) is such that pulse 200 will not reverse the polarity on the magnetic recording medium, but instead pulse 200 will distort the recorded fields in such a way that the resulting read waveform will be closer to ideal.

A second goal of the invention is programmability. If, for example, a particular magnetic medium requires a compensation pulse that has a pulse width of one-half of a bit cell width and placed at the edge of a bit cell with no displacement, then the circuitry can be programmed to provide such a pulse.

Note that the waveform in FIG. 2B is simply the waveform in FIG. 2A after passing through a binary divide-by-two circuit. That is, the waveform in FIG. 2B has one rising edge for every two rising edges of the waveform in FIG. 2A. In the sample embodiment discussed below, the division operation occurs after equalization. Therefore, in the sample embodiment discussed below, in order to generate pulse 200 after division, two pulses need to be generated before division. Therefore, in the sample embodiment below, two pulses (202 and 204) are inserted into the unencoded write data signal, as illustrated in the waveform in FIG. 2D, to generate a single pulse 200 in the encoded write data signal, as illustrated in the waveform in FIG. 2C.

Figure 3:
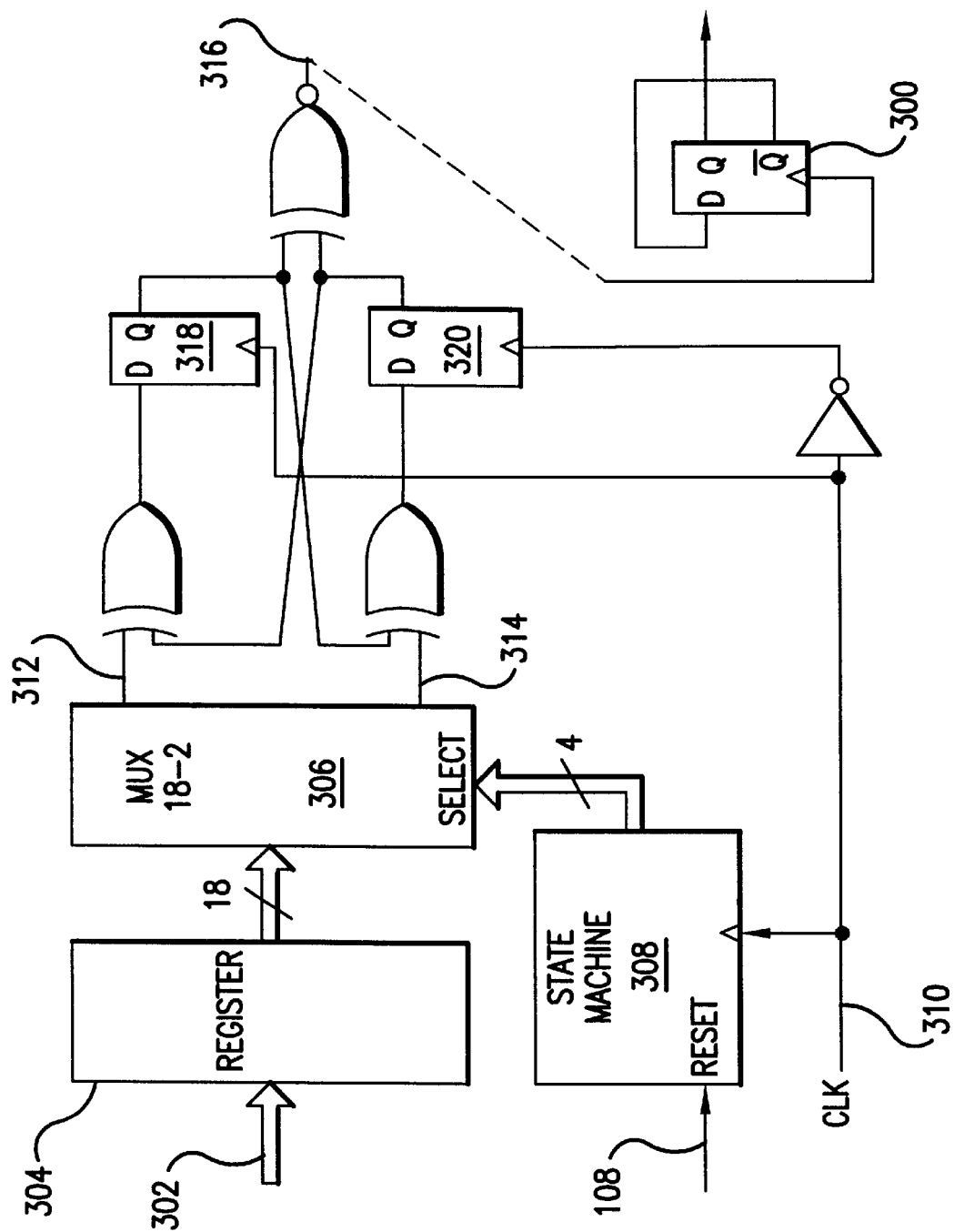
FIG. 3 is a block diagram of one embodiment of the invention.

FIG. 3 illustrates an example embodiment of a programmable circuit capable of implementing general algorithms for generating write compensation pulses. The embodiment illustrated in FIG. 3 receives an unencoded (and uncompensated) write data signal 108 (for example, the waveform in FIG. 2A). FIG. 3 includes a divide-by-two circuit 300 as discussed in conjunction with the waveform in FIG. 2D. Circuit 300 is included for illustration of a particular implementation. In general, however, the write compensation circuitry of FIG. 3 may be used to implement write compensation after encoding or the circuitry may be used to implement write compensation for other types of encoding.

In FIG. 3, a binary pattern 302 is received and latched into a register 304. A multiplexer 306 receives the bits from the register 304 and provides as outputs one or more of the received bits, as selected by a state machine 308. State machine 308 is reset at each rising edge of the unencoded write data signal 108. For each cycle of clock 310, the state machine 308 changes to a next state and different bits from register 304 are selected for output from the multiplexer 306.

For purposes of illustration, assume that the multiplexer 306 has a single output and assume that the state machine 308 is a simple sequential counter. For these assumptions, immediately after reset (by a rising edge of signal 108), the state machine 308 selects the first bit of register 304. At the next rising edge of clock 310 the state machine 308 selects the next bit of register 304 and so forth. Assume that clock 310 is an integral multiple of the bit frequency of the unencoded write data signal 108. Each bit cell can then be divided into many small intervals for purposes of the output waveform and the output waveform will correspond to the bits stored in register 304. For a specific example, assume that the time interval of a bit cell is divided into six equal parts (clock 310 is six times the bit frequency of the unencoded write data signal 108). For the specific example, assume also that register 304 is 18 bits long, that multiplexer 306 receives 18 bits and provides a single output, that the state machine is a simple sequential counter, and that waveform 108 is identical to the waveform in FIG. 2A. If register 304 contains the pattern 111111000000000000 (where the left bit of the pattern as written corresponds to time T0 in FIGS. 2A–2D), then the output of the multiplexer is identical to the input waveform 108. That is, for the first six clock cycles the output is high and the output is then low for the next 12 clock cycles. Alternatively, if the register contains the pattern 111111000000001010, then the output of the multiplexer is identical to the waveform in FIG. 2D, with a pair of pulses (202 and 204) during the third bit cell.

In the above simplified example, the output waveform is the input waveform with the addition of a pair of pulses. However, note that the register pattern can be any arbitrary combination of bits. In addition, note that a more general state machine can select portions of the register pattern in a non-sequential manner and in particular can repeat sections of the register pattern. The only fixed relationship between the input waveform 108 and the output waveform 316 is that rising edges of the input waveform 108 reset the fixed sequence of states that produce the output waveform 316.

In a specific embodiment, the clock 310 is three times the bit frequency, the register 304 is 18 bits long, the multiplexer receives 18 bits and outputs two bits, and the state machine has four output bits. Providing two multiplexer output bits for every clock cycle enables the clock frequency to be reduced by a factor of two. Each four-bit state from the state machine 308 selects two sequential input bits to the multiplexer 306. In the specific embodiment, the state machine 308 counts from zero to eight (nine clock cycles=three pulse periods), then returns to state six and repeats states six through eight (the pattern in the third pulse period is repeated) until reset. The multiplexer 306 outputs the 18 bits of register 304 in sequential pairs and then, in response to state machine 308, repeatedly outputs the last 6 bits of register 304 in sequential pairs until state machine 308 is reset.

In FIG. 3, after each rising edge of clock 310, output 316 is identical to a first multiplexer output 312 and after each falling edge of clock 310, output 316 is identical to the second multiplexer output 314. Note that latch 318 latches on the rising edge of clock 310 and latch 320 latches on the falling edge of clock 310. The arrangement of exclusive OR gates ensures glitch-free transitions of output 316.

In the specific embodiment described above, the general compensation algorithm is as follows: if there are two or more successive "zeros", for every "zero" after the first, write a special pattern. Given that each bit cell is divided into six time intervals, the special pattern during the second and successive "zero" bit cells can be any combination of six highs and lows as defined in the last six bits of register 304. Therefore, pulse width and pulse placement are programmable to intervals of one sixth of a bit cell. In the specific embodiment, run length rules have already been applied to the write data signal so that successive "ones" are not permitted in waveform 108. Therefore, the first two bit cell time intervals in the output waveform are always as illustrated in the waveform in FIG. 2A. In the specific embodiment, the register pattern is 111111000000001010. After a state machine reset the first six outputs at output 316 will be high and the following six outputs will be low. Then, a pair of pulses is generated during the bit cell intervals for the second and successive "zeros" in the input waveform. Again, it should be apparent that the circuit of FIG. 3 can be reprogrammed to accommodate different write compensation rules by simply writing a new bit pattern 302 into register 304.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for generating a compensated write signal for magnetic data recording, the method comprising the following steps:

receiving, by a compensation circuit, an uncompensated write signal, the uncompensated write signal comprising first bits encoded as a series of transitions between discrete states;

receiving, by the compensation circuit, a clock signal, the clock signal comprising a series of pulses;

receiving, by the compensation circuit, a set of pattern bits, the pattern bits having a sequential order with the sequential order having a beginning;

outputting, as the compensated write signal, by the compensation circuit, at least two pattern bits, in the sequential order, for each first bit, outputting at least one pattern bit per clock pulse; and starting an output sequence of at least two pattern bits, at the beginning of the sequential order, in response to a transition of the uncompensated write signal.

2. The method of claim 1, further comprising:

the compensation circuit including a state machine and a multiplexer, the state machine having an initial state;

receiving the uncompensated write signal by the state machine;

receiving the clock signal by the state machine;

switching a state of the state machine in response to the clock signal;

resetting the state machine to the initial state in response to a transition of the uncompensated write signal;

receiving the set of pattern bits by the multiplexer;

receiving the state of the state machine by the multiplexer;

selecting at least one pattern bit, by the multiplexer, as determined by the state of the state machine; and outputting, as the compensated write signal, by the multiplexer, the selected bit.

* * * * *